Dec. 30, 1924.
R. TROSETH
1,520,985
WATER LEVEL INDICATOR
Filed May 29, 1923
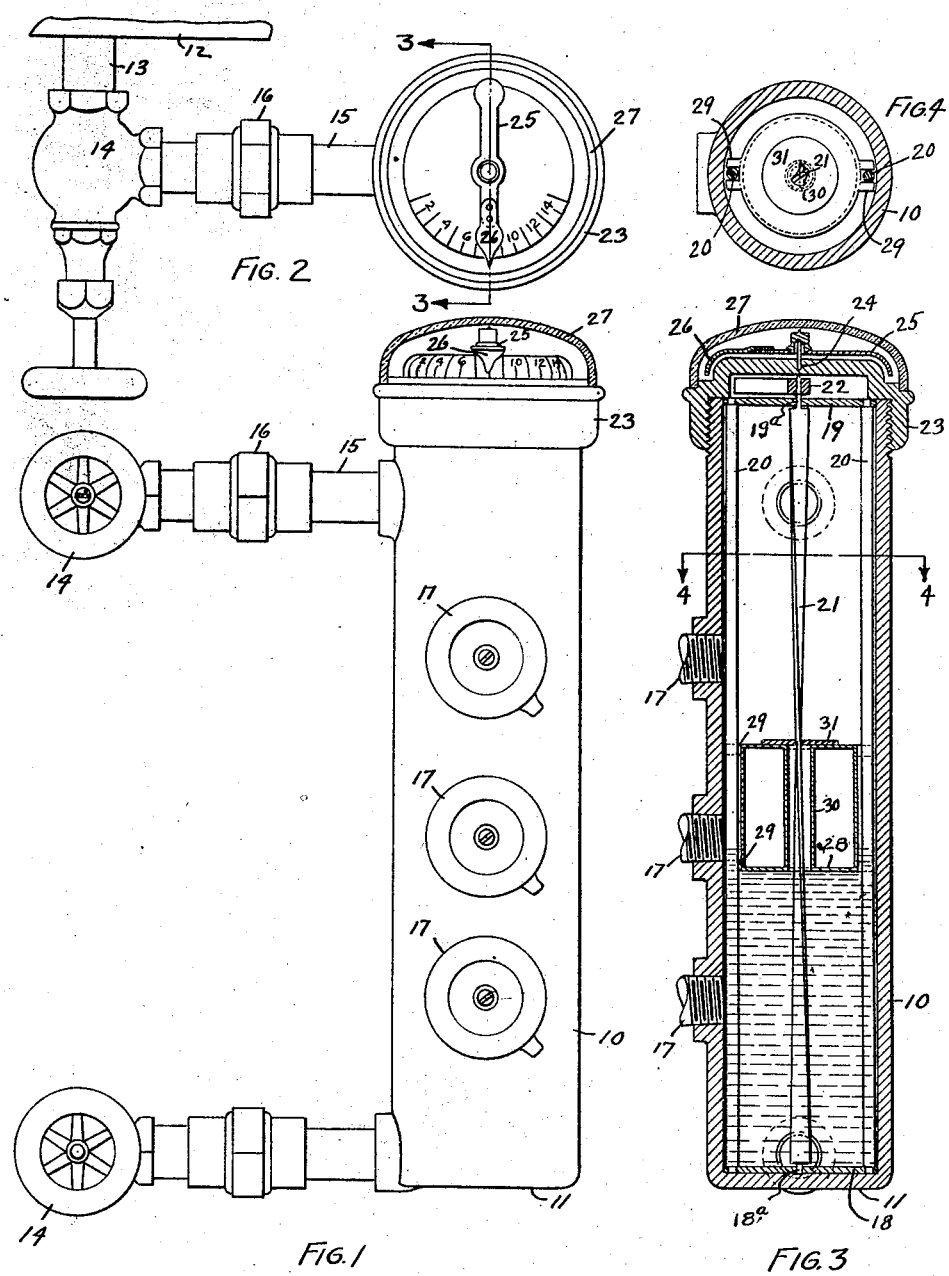
INVENTOR
Ralph Troseth
By E B Birkenbeuel
ATTORNEY Patented Dec. 30, 1924.

1,520,985

UNITED STATES PATENT OFFICE.

RALPH TROSETH, OF PORTLAND, OREGON.

WATER-LEVEL INDICATOR.

Application filed May 29, 1923. Serial No. 642,180.

*To all whom it may concern:*

Be it hereby known that I, RALPH TROSETH, a citizen of the United States, and a resident of Portland, in the county of Multnomah and State of Oregon, have invented a new and useful Water-Level Indicator, of which the following is a specification.

This invention relates more particularly to means for indicating the height of water in a boiler.

The object of my invention is to provide a magnetically actuated indicator which will accurately indicate the height of water in a boiler without employing glass under pressure.

Figure 1 is a front elevation of my device and Figure 2 is a plan view. Figure 3 is a vertical section along the line 3—3 in Fig. 2. Figure 4 is a horizontal section along the line 4—4 in Fig. 3.

Similar numbers of reference refer to the same parts throughout the several views.

Referring in detail to the drawing, the device is constructed in the form of a cylindrical body or water column 10 having a closed bottom 11 which body is connected to a boiler 12 at its upper and lower ends respectively by means of the usual nipple 13, an angle valve 14 and a pipe 15, which includes a union 16.

Within the body 10 a mechanism is positioned consisting of a pair of disks 18 and 19 permanently spaced apart by means of the shouldered rods 20. Journaled in apertures in the disks 18 and 19 is a flat spiral shaft 21 making approximately a 180 degree turn in its full length. The lower end of the shaft 21 is rounded and journals in the aperture 18ª in disk 18, and the upper end of the shaft 21 is also rounded and journals in and passes through the aperture 19ª in disk 19. On the projecting end of the shaft 21 is placed a horseshoe magnet 22 which is free to rotate above the top of the disk 19. A cap 23 is screwed down upon the body 10. On the upper side of the cover 23 I have placed a pivot 24 upon which is mounted a non-magnetic needle 25 having a steel or iron pointer 26 secured at one end and having a glass cover 27 completely protecting the needle 25 at all times.

Turning again to the interior of the body 10 it will be observed that I have placed therein a cylindrical float 28 guided at its sides by the rods 20 which pass freely between the lugs 29 on the sides of the cylinder 28. A tube 30 is secured in the center of the float 28 and serves to support the float from collapsing under pressure. On the top of the float 28 I have secured a disk 31 having a slot formed therein adapted to loosely receive the flat shaft 21.

The cap 23 must be constructed of a non-magnetic metal in order to permit the proper magnetic attraction between the magnet 22 and the portion 26 of the needle 25.

The operation of my device is as follows: When the valves 14 are open water enters the body 10 and raises the float 28 correspondingly. This movement of the float 28 causes the shaft 21 to rotate and to swing the horseshoe magnet 22 around under the cap 23.

While I have thus illustrated and described my invention it will be understood that I do not wish to limit myself to this precise form or method of construction, for instance where the level of the observer's eye is below the needle, the dial may be placed above the needle without departing from the spirit of my invention.

What I claim as new is:

A water level indicator comprising a water column adapted to be attached to a boiler, said column having a closed bottom and a threaded open upper end, in combination with a pair of disks adapted to fit in said column; a pair of spacer rods adapted to hold said disks at opposite ends of said water column; a spiral shaft journaled in said disks; a float slidably and non-rotatably guided by said spacer rods and adapted to rotate said shaft when said float moves vertically; a magnetized arm secured on the upper end of said spiral shaft; a nonmagnetic cap screwed on the upper end of said column completely enclosing said magnetic arm within said column; a nonmagnetic needle pivotally mounted on said cap over said magnetic arm and coaxial therewith, said needle having an iron point secured to one end thereof; a transparent cover secured to said cap over said needle; and a graduated scale formed on said cap.

RALPH TROSETH.